United States Patent Office 3,441,289
Patented Apr. 29, 1969

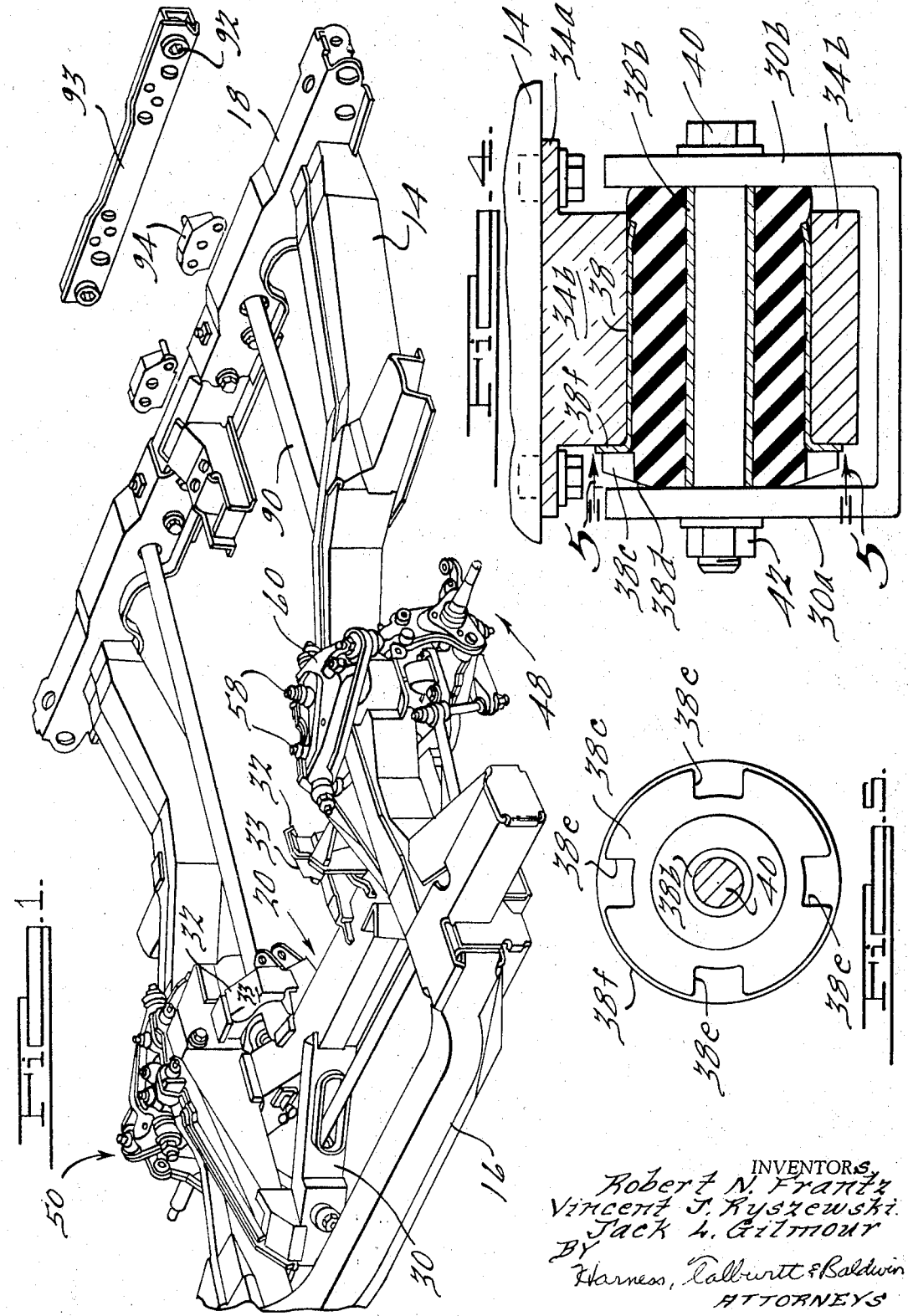

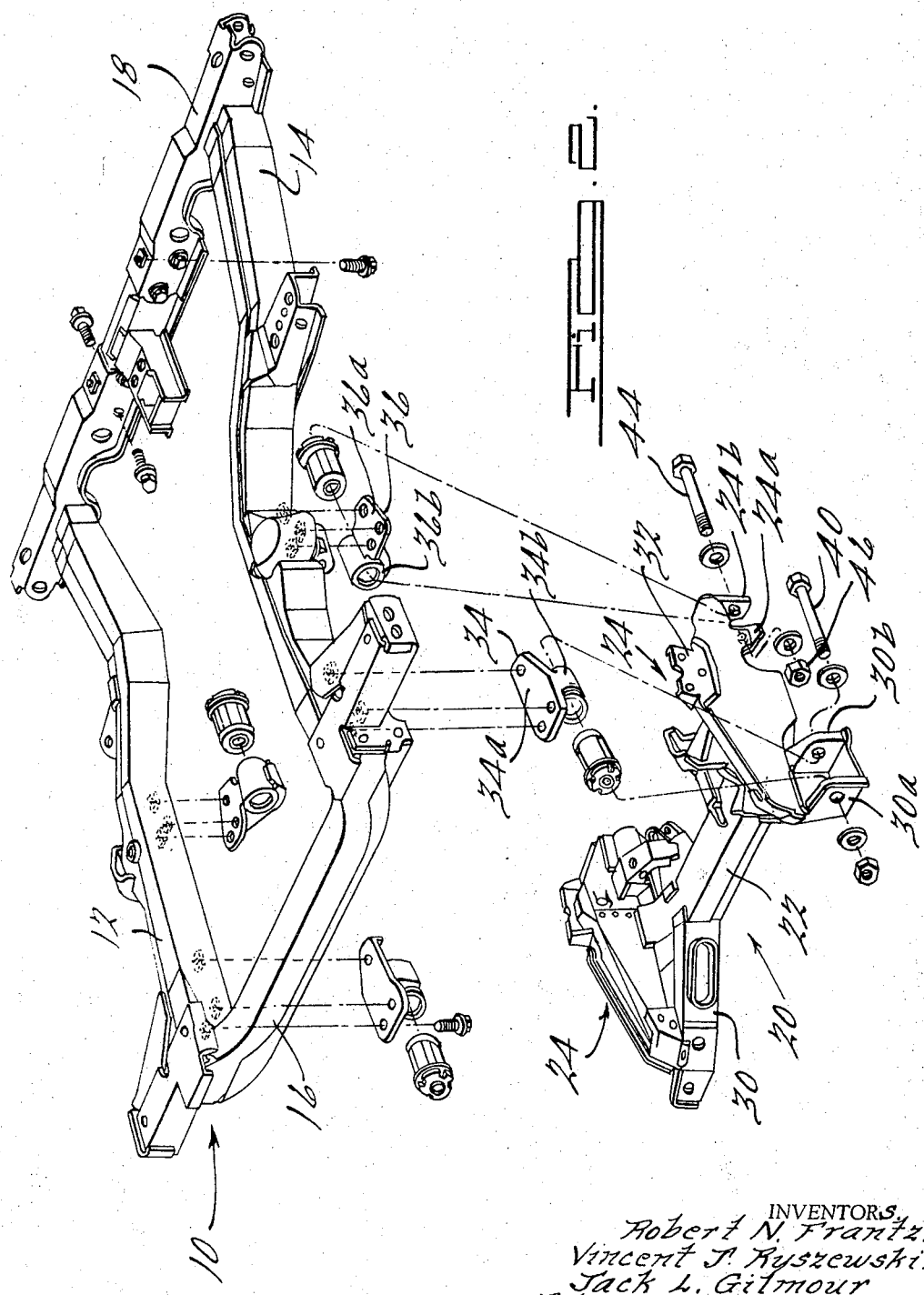

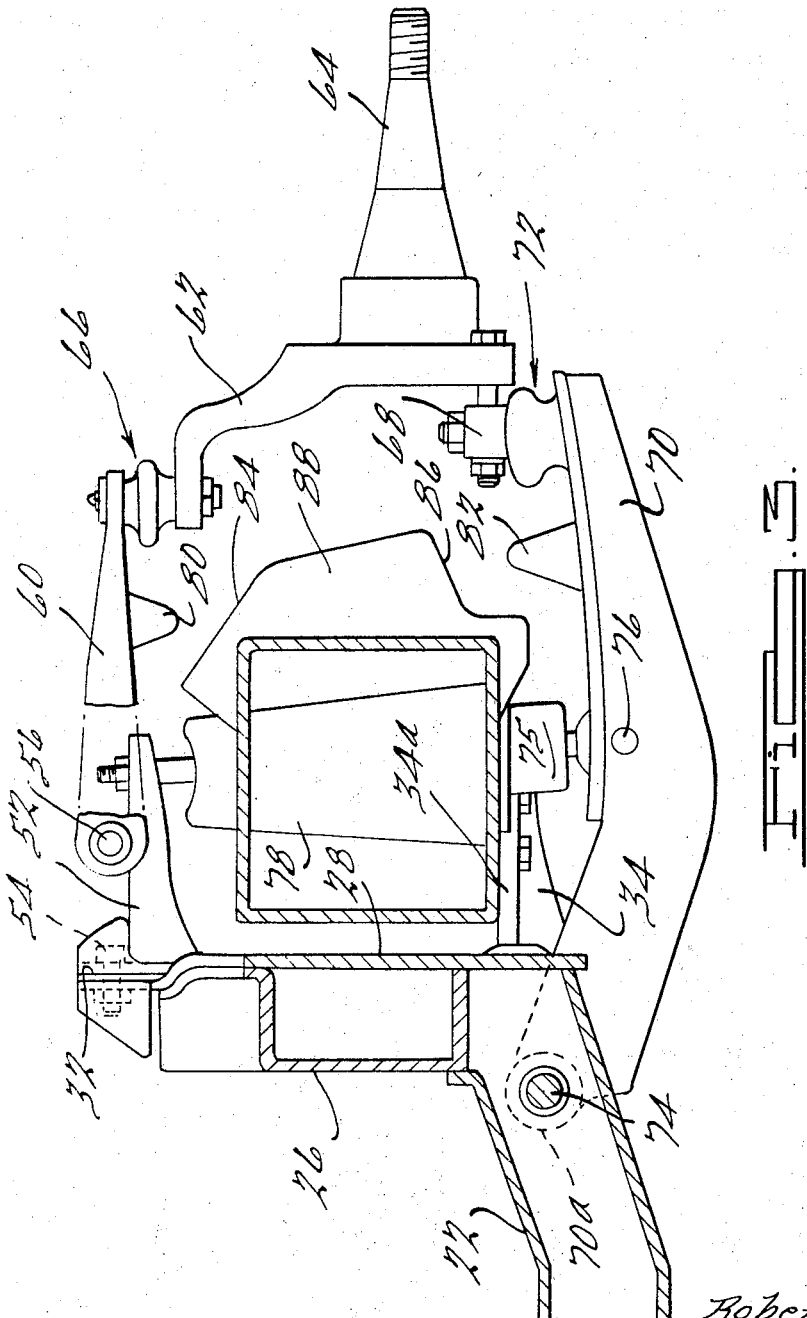

3,441,289
DROP OUT FRONT CROSS MEMBER
Robert N. Frantz, Birmingham, Vincent J. Ryszewski, Detroit, and Jack L. Gilmour, Birmingham, Mich., assignors to Chrysler Corporation, Highland Park, Mich., a corporation of Delaware
Filed Sept. 2, 1966, Ser. No. 577,004
Int. Cl. B60g *11/38*
U.S. Cl. 280—106
10 Claims

ABSTRACT OF THE DISCLOSURE

A specially constructed front end assembly for a motor vehicle in which the front wheel assemblies are pivotally secured to the opposite ends of a cross member which is rubber isolated from the side rails of the vehicle; each end of the cross member is mounted to the adjacent side rail member at two longitudinally spaced points and the rubber isolator comprises in each case a longitudinally oriented tubular member which is received in a socket carried by the related side rail with the socket in turn being positioned within a pocket defined between two longitudinally spaced, confronting walls on the cross member. A bolt passes through longitudinally aligned apertures in the confronting walls and through the tubular isolator to squeeze the walls against the opposite ends of the isolator.

---

This invention relates to a front suspension system for a motor vehicle. More particularly, it relates to a front suspension system especially designed to prevent noise and vibration generated at the front wheel assemblies from entering the body structure.

The front suspension system of the invention is especially suited to, but not limited to, a body structure of the unitized type wherein no separate frame is employed.

It is an object of the present invention to provide an improved front suspension system for a motor vehicle.

A more specific object is to provide a front suspension system which is especially suitable for use with a motor vehicle having a unitized body.

Yet another object is to provide a front suspension effective to absorb noises and vibrations generated at the wheel assemblies and prevent their transmittal to the body structure.

A more specific object is to provide a front end suspension for use with a motor vehicle having a unitized body structure wherein means are provided to prevent or substantially reduce "telegraphing" of road noises and vibrations generated at the wheel assemblies to the passenger compartment through the unitized body structure.

The front end suspension of the invention includes a cross member which extends transversely of the body side rail members adjacent the forward end of the motor vehicle and to the opposite ends of which the left and right front wheel assemblies are pivotally mounted. According to the invention, means are provided to mount each end of the cross member to the adjacent side rail member at at least two longitudinally spaced points along that rail member and an isolator member of resilient material is interposed between the cross member and the adjacent side rail at each of the mounting points. This arrangement precludes direct metal to metal contact between the cross members and the side rail members and serves to cushion the body structure against road shocks and noise generated at the wheel assemblies.

In the disclosed embodiment of the invention, each of the resilient isolator members is generally tubular in form and the aforesaid mounting means for each isolator member comprises a pin passing through the related isolator member and a socket receiving the isolator member. The longitudinal axis of each of the mounting pins, and therefore of the tubular isolator member received thereover, is generally parallel to the longitudinal axis of the vehicle so as to allow a controlled amount of fore and aft movement of the suspension cross member relative to the body structure.

Other objects, features and advantages of the invention will be apparent from the following detailed description of a preferred embodiment of the invention and from the accompanying drawings wherein:

FIG. 1 is a perspective view of a portion of a motor vehicle having a front end suspension system according to the invention;

FIG. 2 is an exploded perspective view similar to FIG. 1 but with the front wheel assemblies omitted;

FIG. 3 is a cross sectional view taken on line 3—3 of FIG. 1;

FIG. 4 is a fragmentary cross sectional view showing details of one of the mounting means for the front suspension cross member; and FIG. 5 is a cross sectional view taken on line 5—5 of FIG. 4.

FIGS. 1 and 2 disclose a sub-frame assembly 10 of box form comprising a right side rail 12, left side rail 14, front cross member 16, and rear cross member 18. Sub-frame assembly 10 is adapted to be bolted to a body of unitized construction to form the forestructure of that body. Although the invention is described herein with particular reference to a unitized body having a sub-frame forestructure, it will be understood that the invention is not limited to such a body structure but is also applicable to fully unitized body structures or to body structures employing separate, full length, frames.

The suspension system of the invention includes a special suspension cross member 20 extending transversely between side rails 12 and 14 adjacent the forward end of the vehicle. Cross member 20 is seen in assembled relation to sub-frame 10 in FIG. 1 and in exploded relation to sub-frame 10 in FIG. 2.

Cross member 20 is a composite welded structure comprising a central beam member 22 of box cross section and left and right tower structures 24 welded to the opposite ends of central beam member 22. Each tower structure 24 comprises a horizontally disposed channel member 26 (FIG. 3) welded to a vertical plate 28 to form therewith a box structure which is welded to the respective end of the beam member 22. Cross member 20 further includes left and right diagonal braces 30 which are welded at one end to the central beam member 22 and extend diagonally forward therefrom to pass immediately beneath the forward end of the related tower structure 24. Each brace 30 is welded to the respective tower structure 24 at the interface therebetween. The end of each diagonal brace 30 outboard of the related tower structure 24 is configured to define a pair of longitudinally spaced, vertically extending walls 30a and 30b having longitudinally aligned apertures therein. The rearward portion of each tower structure 24 is similarly configured to define a pair of spaced walls 24a and 24b having longitudinally aligned apertures therein. The upper portion of each tower structure plate 28 is selectively recessed to provide an outwardly facing mounting surface 31. Cross member 20 further includes left and right brackets or cradles 32 which present angled, opposed surfaces 33 on which the front end of the engine (not shown) is cradled. The vehicle steering gear (not shown) is also carried by cross member 20.

A socket member 34 is bolted to the underside of each side rail 12, 14 adjacent the forward end thereof and a socket member 36 is bolted to the underface of each side rail 12, 14 in rearwardly spaced relation to the related socket member 34. Each of the socket members 34, 36 includes a base portion 34a, 36a by which the socket member is secured to the overlying side rail and a tubular portion 34b, 36b which is adapted to be received between the spaced walls 30a, 30b and 24a, 24b, respectively.

The suspension cross member 20 is connected to side rails 12 and 14 by resilient isolator members 38, best seen in FIGS. 4 and 5. Each isolator member 38 is formed of a suitable resilient material, such for example as hard rubber, and is generally tubular in form. An outer metallic sleeve or shell 38a forms the external periphery of each isolator member and an inner sleeve 38b forms the internal periphery of each isolator member. Each isolator member further includes a resilient flange portion 38c extending radially outwardly from the cylindrical outer periphery of the main body portion at one end of the isolator member. The radially outer edge of the axially outer face of the flange portion of each isolator member is chamfered at 38d; each flange portion is also selectively cut away at 38e to divide the radially outer portion of the flange portion into a plurality of circumferentially spaced segments.

The outer metallic sleeve 38a of each isolator member is provided with a flange portion 38f to provide a metallic backing for resilient flange portion 38c. In assembled relation, the forward isolator members 38 are inserted with a press fit into the related socket 34b to press flange portion 38c against the forward face of socket portion 34b. Each forward isolator member is further received between the spaced walls 30a, 30b provided by the related diagonal brace 30. Walls 30a, 30b are squeezed tightly against the opposite ends of the isolator member by a pin or bolt 40 passing through the aligned apertures in walls 30a, 30b and through the inner sleeve 38b for engagement by a nut 42.

Each rearward isolator member is inserted into rearward socket portion 36b to press flange portion 38c against the rearward face of socket portion 36b. Each rearward isolator member is positioned between spaced walls 24a, 24b provided by the related tower structure 24. Walls 24a, 24b are thereafter squeezed together in clamping relation to the isolator member by a pin or bolt 44 passing through the aligned apertures in walls 24a, 24b and through central sleeve 38b for engagement by a nut 46.

It will be seen that the cross member 20 is thus rubber mounted at each end to the adjacent side rail at two longitudinally spaced points along that rail. This mounting arrangement precludes metal to metal contact between cross member 20 and side rails 12, 14 so that any noise or vibration generated in cross member 20 will be largely absorbed by the resilient material comprising isolator members 38. It will be noted that forward or rearward movement of the cross member 20 relative to the sub-frame assembly 10 is limited by the engagement of socket portions 34b by the flange portions 38d of the forward isolator members and the engagement of socket portions 36b by the flange portions 38d of the rear isolator members.

A controlled amount of relative forward movement is permitted however by the yielding compression of flange portions 38c of the rear isolator members between socket portions 36b and walls 24b and a controlled amount of relative rearward movement is permitted by the yielding compression of flange portions 38c of the front isolator members between socket portions 34b and walls 30a. The chamfer 38d on the flange portion of each isolator member allows that portion to yield readily to relatively small forces generated at the wheel asesmblies, whereby to absorb these forces and preclude their transmittal to the body structure. When larger forces are generated at the wheel assemblies, however, the flange portions quickly initially yield or deflect to take up the void created by the chamfer, whereafter the yield rate is determined by the compression of the rubber of the flange portions between the confronting faces of the socket portions 34b, 36b and the walls 30a, 24b. Thus, the yield rate of the isolator member is initially relatively high, whereby to effectively absorb small shocks generated by minor irregularities in the road surface, whereafter the yield rate becomes significantly lower to avoid mushiness or excessive lost motion in the front end suspension. The amount and rate of relative fore and aft movement permitted may be selectively varied by varying the durometer of the material of the isolator member and/or by varying the size and/or shape of the chamfer 38d.

Left and right independent wheel suspension assemblies 48 and 50 are pivotally mounted to cross member 20. Each wheel suspension assembly, as best seen in FIG. 3, includes a bracket 52 secured in cantilever fashison to the mounting face 32 of the respective tower structure plate 28 by bolts 54; a pivot shaft 56 secured to bracket 52 by bolts 58 (FIG. 1); an upper control arm 60 of generally V-shape pivotally secured to the opposite ends of shaft 56; a knuckle 62 connected to upper control arm 60 by ball joint assembly 66; spindle 64 carried by knuckle 62 and adapted to rotatably mount the wheel assembly (not shown); a knuckle arm 68 bolted to knuckle 62; a lower control 70 connected to knuckle arm 68 by ball joint assembly 72 and pivotally secured to the outer end of central beam member 22 by a pivot shaft 74; a shock absorber 75 pivoted at its lower end 76 to lower control arm 70 and extending upwardly therefrom through a sheath 78 embedded in the related side rail for connection at its upper end to the outer end of bracket 52; upper and lower snubbers or bumpers 80, 82 carried by the upper and lower control arms respectively and positioned to bottom on faces 84 and 86 provided by a lateral extension 88 of the related side rail; and a torsion bar having a hexagonally shaped forward end (not seen) plugged into a hexagonal socket provided at the rearward end of the hub portion 70a of lower control arm 70. The rear end of each torsion bar is also hexagonal in cross section and passes through rear cross member 18 for receipt in a hexagonal socket 92 provided in a rear anchor cross member 93. Rear anchor member 93 is adapted to be bolted to rear cross member 18 with resilient isolator members 94 positioned therebetween to isolate the sub-frame 10 from noise and vibration transmitted from the wheel assemblies through the torsion bars. Further details of the manner in which the torsion bars are isolated from the sub-frame are disclosed in copending United States patent application Ser. No. 385,699 filed July 28, 1964 now Patent No. 3,288,487.

Since the wheel suspension assemblies are carried in their entirety by suspension cross member 20 and since cross member 20 is rubber isolated in the manner previously described from sub-frame 10, it will be seen that the sub-frame and therefore the passenger compartment are cushioned from noise and vibration generated at the wheel assemblies.

Although a preferred embodiment of the invention has been illustrated and described in detail, it will be understood that various changes may be made in the disclosed embodiment without departing from the scope or spirit of the invention as defined in the appended claims.

We claim:
1. A motor vehicle comprising:
(A) a body structure defining spaced longitudinal side rail members;
(B) a front suspension assembly comprising
   (1) a cross member extending traversely of said side rail members adjacent the forward end of said motor vehicle,
   (2) left and right front wheel assemblies,
   (3) independent suspension means pivotally mounting said wheel assemblies to the opposite ends of said cross member;
(C) means mounting each end of said cross member to the adjacent side rail member at at least two longitudinally spaced points along that rail; and
(D) an isolator assembly interconnecting said cross member and the adjacent side rail at each of said mounting points, the isolator assembly interconnecting the cross member and the related side rail member comprising in each case
   (1) a generally tubular isolator element of resilient material,
   (2) means on one of the interconnected members defining a pair of longitudinally spaced, generally vertical, confronting mounting walls defining a pocket therebetween for receipt of an isolator element,
   (3) a pin passing through longitudinally aligned apertures in said mounting walls and through said isolator element to orient the isolator element with its central axis extending generally longitudinally, and
   (4) means on the other of said interconnected members defining a generally cylindrical, longitudinally extending socket positioned between said mounting walls and receiving said isolator element therewithin.

2. A motor vehicle according to claim 1 wherein:
(E) each said socket is carried by the related side rail member and
(F) each said pair of mounting walls is defined by said cross member.

3. A motor vehicle according to claim 1 wherein:
(E) each said tubular isolator element includes a flange portion at one end thereof,
   (1) each forward isolator element being positioned within the related socket with the flange portion thereof engaging the forward face of the socket, whereby to preclude rearward movement of said cross member relative to said body structure and
   (2) each rearward isolator element being positioned within the related socket with the flange portion thereof engaging the rearward face of the socket, whereby to preclude forward movement of said cross member relative to said body structure.

4. A motor vehicle according to claim 3 wherein:
(H) each said socket is carried by the related side rail member; and
(I) each said pair of mounting walls is defined by said cross member.

5. A motor vehicle according to claim 1 wherein:
(E) each said independent suspension means includes
   (1) a torsion bar extending generally longitudinally of the vehicle and having one end arranged to be rotated in response to movement of said wheel assemblies relative to said cross member;
   (2) an anchor member fixed to said body structure and receiving the other end of said torsion bar to hold the same against rotation relative thereto; and
   (3) a resilient isolator element interposed between said anchor member and said body structure to allow fore and aft movement of said anchor member and torsion bar relative to said body structure in response to fore and aft movement of said cross member relative to said side rails.

6. A motor vehicle comprising:
(A) a body stucture defining spaced longitudinal side rail members;
(B) a front suspension assembly comprising
   (1) a cross member extending transversely of said side rail members adjacent the forward end of said motor vehicle,
   (2) left and right wheel assemblies,
   (3) independent suspension means pivotally mounting said wheel assemblies to the opposite ends of said cross member;
(C) means mounting each end of said cross member to the adjacent side rail member at at least two longitudinally spaced points along that rail,
   (1) each such mounting means comprising
      (a) a generally tubular isolator member arranged with its longitudinal axis generally parallel to the longitudinal axis of the vehicle,
      (b) a socket receiving the isolator member and
      (c) a pin passing through the isolator member
   (2) each isolator member including a flange portion at one end thereof with each forward isolator being positioned within the related socket with the flange portion thereof engaging the forward face of the socket and each rearward isolator being positioned within the related socket with the flange portion thereof engaging the rearward face of the socket, and
   (3) the radially outer edge of the axially outer face of the flange portion of each isolator member being chamfered to allow the flange portion to initially yield readily to forces generated at the wheel assemblies.

7. A motor vehicle comprising:
(A) a body structure defining spaced longitudinal side rail members;
(B) a cross member extending transversely between said side rail members;
(C) means mounting each end of said cross member to the adjacent side rail member at at least two longitudinally spaced points along that rail;
(D) an isolator element of resilient material interposed between said cross member and the adjacent side rail member at each of said mounting points;
(E) an upper control arm pivotally secured to each end of said cross member and passing over the related side rail member;
(F) a lower control arm pivotally secured to each end of said cross member and passing under the related side rail member; and
(G) a knuckle for each such set of upper and lower control arms pivotally secured at its upper end to the free end of the related upper control arm and pivotally secured at its lower end to the free end of the related lower control arm.

8. A motor vehicle according to claim 7 wherein
(H) said cross member comprises
   (1) a central, transversely extending beam member,
   (2) an end structure rigidly secured to each end of said beam member and including a tower structure extending upwardly from the beam member immediately inboard of the related side rail member to define at its upper end the pivotal mounting for the related upper control arm.

9. A motor vehicle according to claim 8 wherein
(I) each such end structure further includes mounting structure extending forwardly and rearwardly of said cross beam member to respectively define forward and rearward mounting points, as aforesaid, for interconnection of said cross member and said side rails.

10. A motor vehicle according to claim 9 wherein
(J) each said isolator element is generally tubular in form,
(K) each end structure is configured at each of said forward and rearward mounting points to define a pair of longitudinally spaced generally vertical, confronting mounting walls defining a pocket therebetween for receipt of the isolator element, and
(L) said mounting means at each mounting point further includes
  (1) a pin passing through longitudinally aligned apertures in said mounting walls and through said isolator element or orient the isolator element with its central axis extending generally longitudinally, and
  (2) means on the related side rail defining a generally cylindrical, longitudinally extending socket positioned between said mounting rails and receiving said isolator element therewithin.

References Cited

UNITED STATES PATENTS

| | | | |
|---|---|---|---|
| 2,636,750 | 4/1953 | Vahey | 280—106 |
| 2,939,720 | 6/1960 | Wroby | 280—106.5 |
| 3,068,020 | 12/1962 | Muller et al. | 280—106.5 |
| 3,201,142 | 8/1965 | Dangauthier | 280—106.5 |
| 3,288,487 | 11/1966 | Bosley et al. | 280—124 |

BENJAMIN HERSH, *Primary Examiner.*

L. DANIEL MORRIS, JR., *Assistant Examiner.*

U.S. Cl. X.R.

296—28